United States Patent [19]
Bantz et al.

[11] Patent Number: 5,123,029
[45] Date of Patent: Jun. 16, 1992

[54] BROADCAST-INITIATED BIPARTITE FRAME MULTI-ACCESS PROTOCOL

[75] Inventors: David F. Bantz, Chappaqua, N.Y.; Robert T. Cato, Raleigh, N.C.; Chia-chi Huang, Yorktown Heights, N.Y.

[73] Assignee: International Business Machines Corporation, Armonk, N.Y.

[21] Appl. No.: 718,525

[22] Filed: Jun. 21, 1991

[51] Int. Cl.⁵ .............................................. H04K 9/00
[52] U.S. Cl. ...................................................... 375/1
[58] Field of Search ............................................ 375/1

[56] References Cited

U.S. PATENT DOCUMENTS

| | | |
|---|---|---|
| 4,271,523 | 7/1981 | Gable .................................. 371/57.1 |
| 4,783,799 | 11/1988 | Maass .................................. 455/26.1 |
| 4,841,527 | 6/1989 | Raychaudhuri et al. ............... 375/1 |

*Primary Examiner*—Salvatore Cangialosi
*Attorney, Agent, or Firm*—Whitham & Marhoefer

[57] ABSTRACT

A hybrid of controlled access and random access schemes using frequency hopping spread spectrum communication techniques is implemented in an indoor digital data radio communication system between mobile stations and a computer system. A hop in the frequency hopping spread spectrum communication system is subdivided into two intervals so that different media-access protocols can be used in each interval. The protocol uses a centralized control scheme in one interval and a decentralized scheme in the other, and the intervals may be varied depending on the load of the system.

14 Claims, 5 Drawing Sheets

FIG. 1
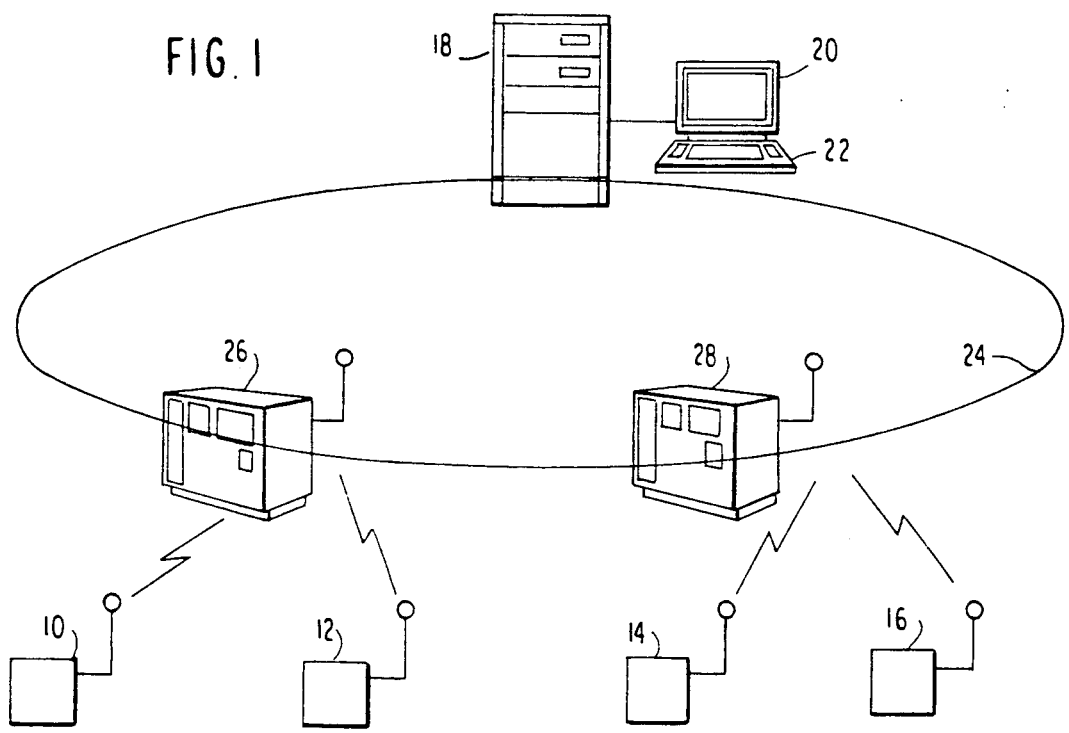
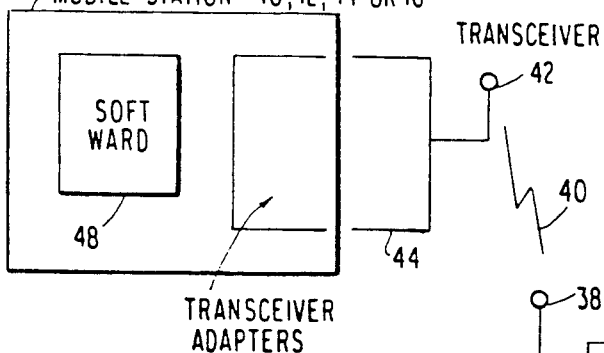
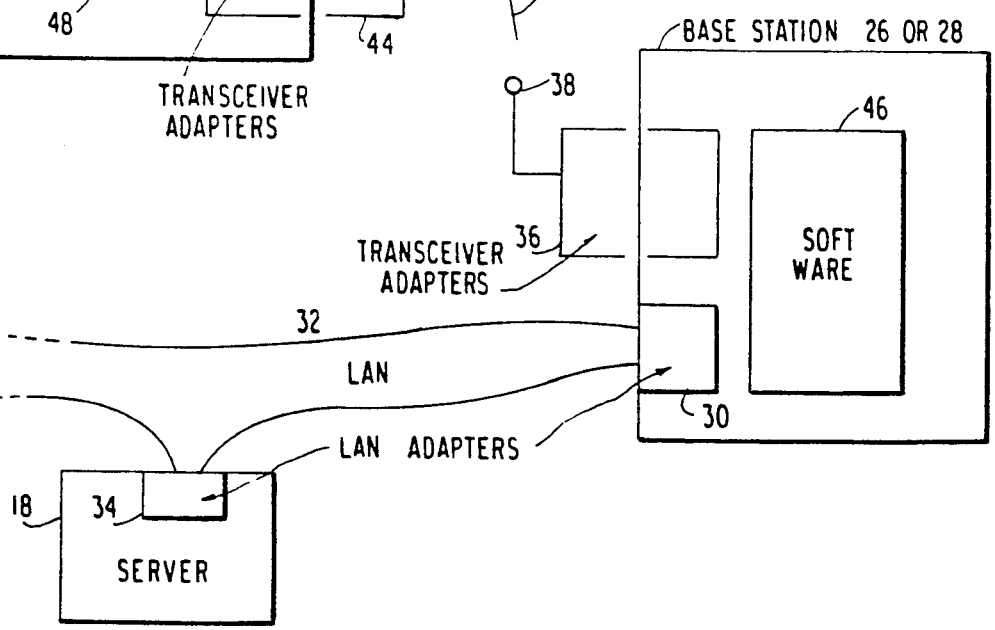
FIG. 1A

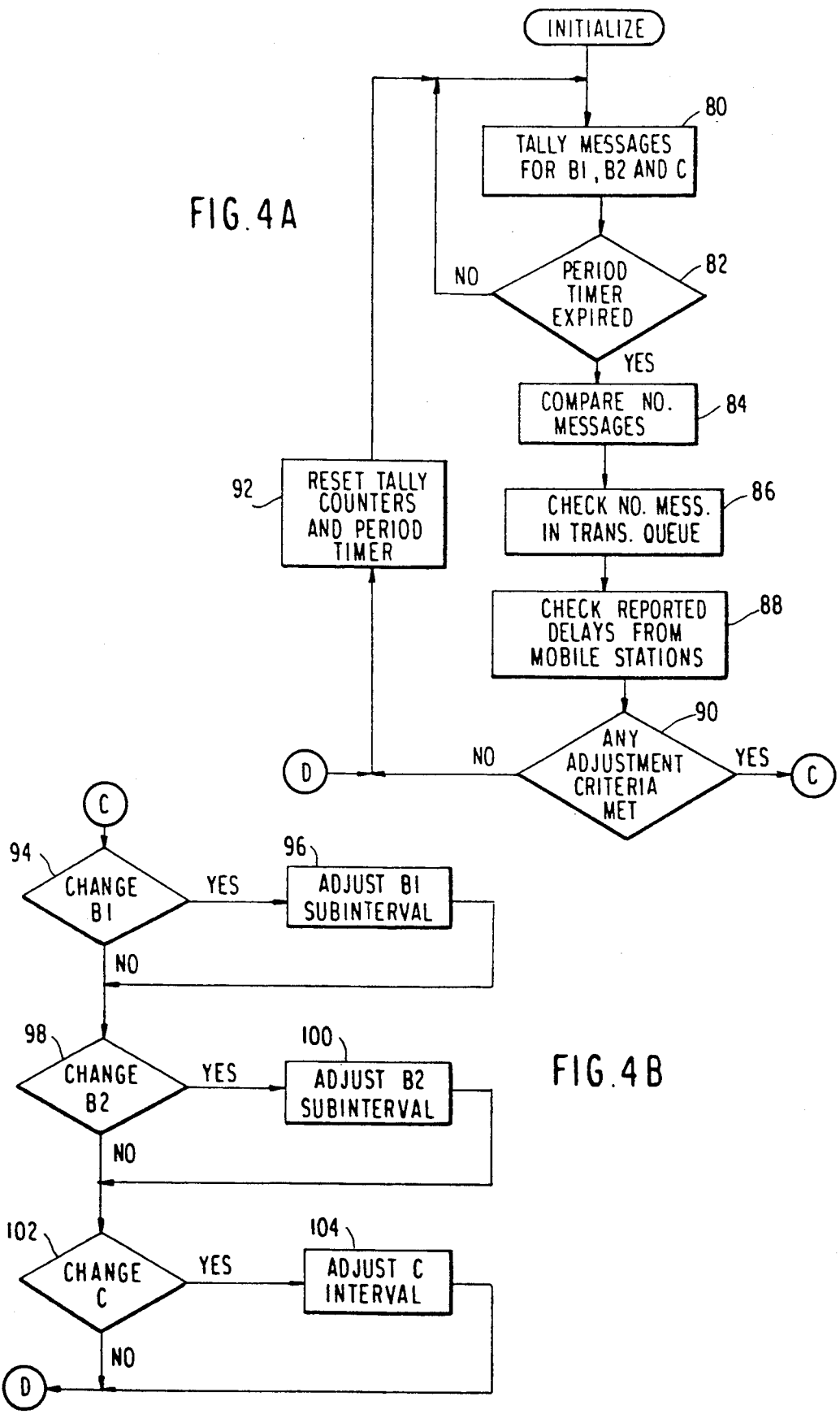

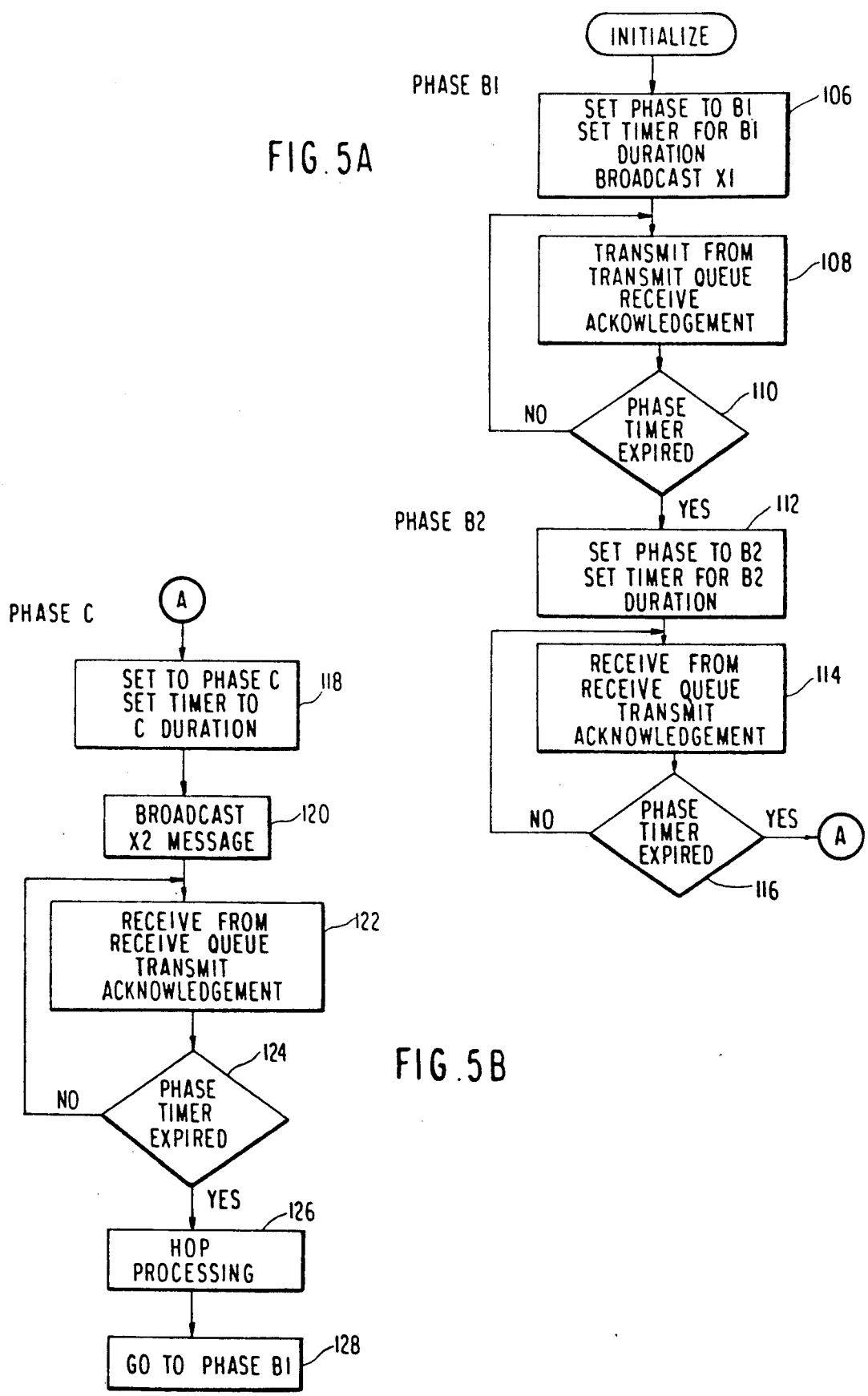

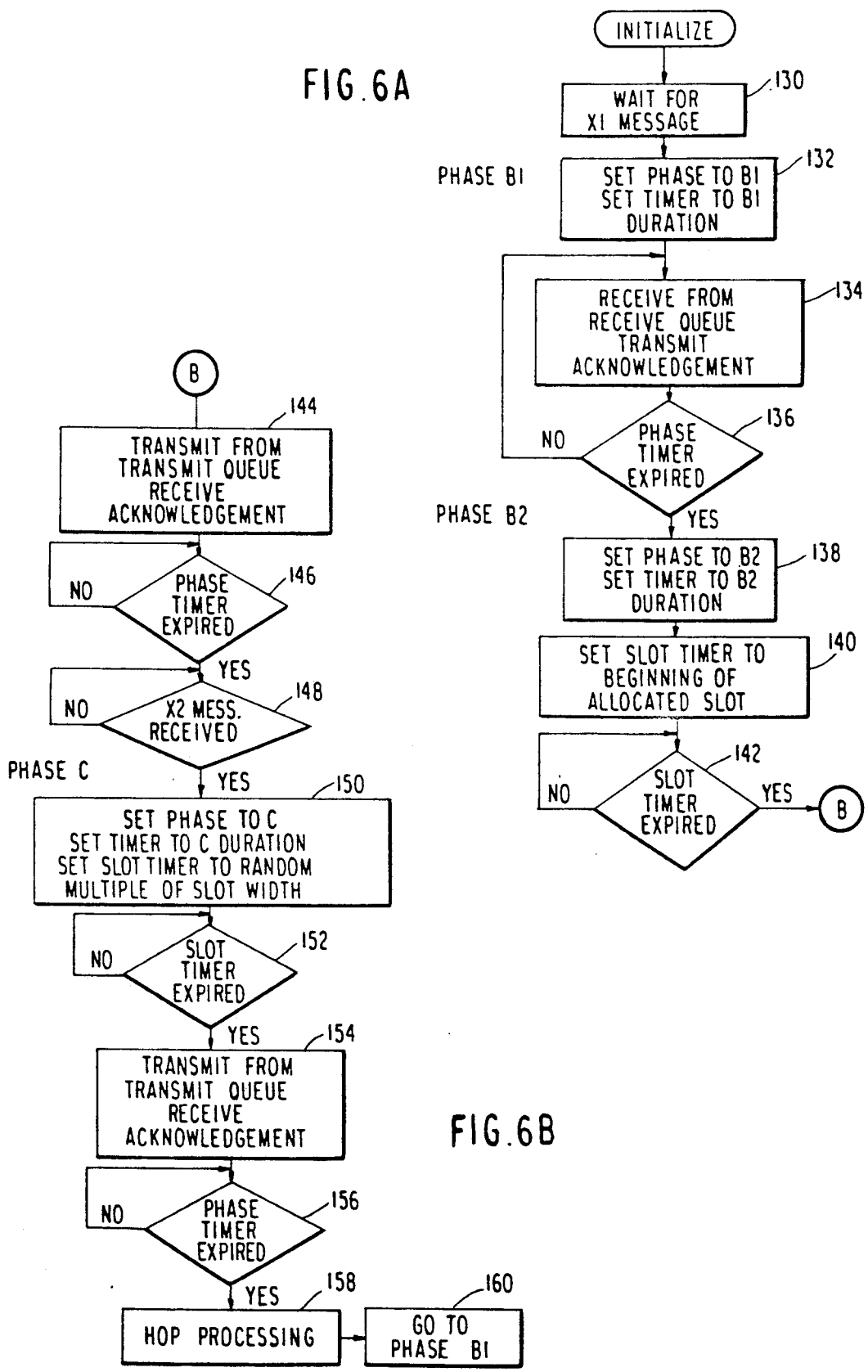

BROADCAST-INITIATED BIPARTITE FRAME MULTI-ACCESS PROTOCOL

CROSS-REFERENCE TO RELATED APPLICATION

The invention disclosed in this application is related in subject matter to that disclose Patent Application Ser. No. 07/605,285 filed Oct. 29, 1990, by Kadathur S Natarajan for "Methods for Polling Mobile Users in a Multiple Cell Wireless Network" and assigned to a common assignee The disclosure of Application Ser. No. 07/605,285 is incorporated herein by reference.

BACKGROUND OF THE INVENTION

1. Field of the Invention

The present invention generally relates to indoor digital data radio communication between a plurality of stations for the purpose of communicating among the stations and accessing various resources attached to the stations In the specifically disclosed environment, a plurality of mobile stations communicate with one or more fixed base stations attached to a computer system, such as a local area network. More particularly, the invention relates to a system in which the base station exercises control over access to the radio channel by periodically broadcasting messages that demarcate fixed intervals of time, called "frames". Furthermore, such messages subdivide frames in a variable manner so as to allow flexible allocation of time to three modes of use of the channel: base station-to-remote transmission, fixed time-slotted allocation of time to various remote stations, and an interval in which remote station may access the channel using various contention mechanisms.

2. Description of the Prior Art

It is very often the case that indoor data radio systems are installed for the purpose of permitting communications between mobile stations and applications and data residing in the computer system of a business enterprise. For example, the business enterprise may include a warehouse storing a diverse inventory. Mobile stations in the form of hand held computers and radio transceivers having bar code readers are used to check the quantities of inventoried products, and the data thus collected is transmitted to a base station for input to the computer system.

A typical structure has mobile stations communicating to a fixed station acting as a gateway or bridge between the radio environment and a conventional local area network (LAN). The fixed station relays messages to other LAN-attached resources. Communications are rarely directly between mobile stations; rather, messages are exchanged with applications residing in fixed nodes. In this structure, it is natural to add certain radio system management functions to those of the gateway, including coordination of the mobile stations, access to the common radio channel. This augmented gateway is referred to herein as a base station.

In indoor digital data radio systems, a key problem is providing efficient access to the channel, as that channel is limited in capacity and shared by all its users. Static channel allocation means, such as frequency division multiplex (FDM) or fixed time division multiplex (TDM), are inefficient for many forms of computer-to-computer traffic, known to be bursty in nature, while other services (e.g., speech transmission, control applications, etc.) require a fixed upper bound on maximum latency for channel access, best satisfied by periodic guaranteed access to the channel.

Efficient radio channel usage is the basic requirement for a practical indoor radio data network. The different types of traffic from various data terminals are usually bursty in nature and not predictable. Random access schemes are known for their short response time when channel load is light. When channel load increases, random access schemes become inefficient and may be unstable. On the other hand, controlled access schemes, such as polling, achieve much better channel use efficiency when loads are heavy. However, polling schemes suffer from overhead as the polling cycle has to be reduced to meet response time requirements.

A protocol for indoor digital data radio systems therefore should have the following characteristics:

1) short access time if the channel is lightly loaded,
2) good channel utilization if the channel is heavily loaded,
3) unconditionally stable,
4) simple to implement, and
5) matched well to typical traffic patterns, where most traffic is outbound from a base station attached to a LAN to the mobile stations.

One form of indoor data radio uses a transmission technique known as "spread spectrum", authorized by the U.S. Federal Communications Commission (FCC) in its regulations, part 15.247, for use in certain frequency bands without user license. Spread spectrum communications offer several advantages including low density power spectra and interference rejection. There are several types of spread spectrum systems including direct sequence digital systems, frequency hopping systems, time hopping systems, pulsed frequency modulated (or chirp) systems, and various hybrids. Of these, the direct sequence digital systems and the frequency hopping systems are perhaps the more widely implemented. In a direct sequence digital system, a fast pseudorandom code generator is used to modulate slower digital data which, in turn, modulates a carrier. In a frequency hopping system, a coherent local oscillator is made to jump from one frequency to another under the influence of a pseudorandom code generator.

The subject invention may be implemented using either direct sequence digital or frequency hopping types of spread spectrum communications systems. A description of these and other types of spread spectrum communications systems may be found, for example, in *Spread Spectrum Systems*, 2nd Ed., by Robert C. Dixon, John Wiley & Sons (1984), and *Spread Spectrum Communications*, Vol. II, by M. K. Simon et al., Computer Science Press (1985).

SUMMARY OF THE INVENTION

It is therefore an object of the present invention to provide a protocol for channel access in a digital data radio system which reduces response time when traffic load is light and increases channel use efficiency when traffic load is intense.

Other objectives of the invention include the support of traffic with latency constraints, the ability to configure a system in different applications with different characteristics, and the ability to guarantee "fairness" under heavy load.

According to the invention, there is provided a hybrid of controlled access and random access schemes using spread spectrum communication techniques.

More specifically, a frame is subdivided into two intervals so that different media-access protocols can be used in each interval. While in principle any protocol could be used in the two intervals, a preferred embodiment of the protocol uses a centralized control scheme in one interval and a decentralized scheme in the other. The relative duration of the intervals may be varied to accommodate varying load conditions.

A preferred embodiment of the invention is implemented using a frequency hopping spread spectrum communication system. In the frequency hopping spread spectrum system, the carrier frequency of the transmitter changes at intervals of time, remaining constant between those instants. The period of constant frequency is called a "hop", and it is only during these hops that messages may be exchanged. Because the hops are of finite duration, they impose a structure on the use of the radio channel; that is, no transmission may occur across a hop boundary. Hops therefore impose a framing structure on time.

The invention provides "transparent connectivity" between client and server programs, in that neither program need be aware of the presence of the wireless link. The "configuration" objective of the invention is accomplished by setting the boundary between intervals at system configuration time. Thus, in a multiple-dumb-terminal application, the base station could be set to poll only, while in a portable PC (personal computer) application, the base station could be set to only allow contention access. The "fairness" objective of the invention is achieved by shifting from contention to polling or allocation as the load increases, thus guaranteeing that no remote station ever gets "locked out" even though a particular remote station might be a weaker contender than others.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a pictorial diagram showing an indoor radio digital data communication system of the type in which the invention is implemented;

FIG. 1A is a block diagram of the system shown in FIG. 1 illustrating the basic components of a mobile station and a base station;

FIGS. 4A and 4B, taken together, are a flow diagram of the logic of the process by which the base station adjusts intervals as a function of traffic load and other factors;

FIGS. 5A and 5B, taken together, are a flow diagram of the logic of the protocol processing by a base station; and FIGS. 6A and 6B, taken together, are a flow diagram of the logic of the protocol processing by a mobile station.

DETAILED DESCRIPTION OF A PREFERRED EMBODIMENT OF THE INVENTION

Figure 2:
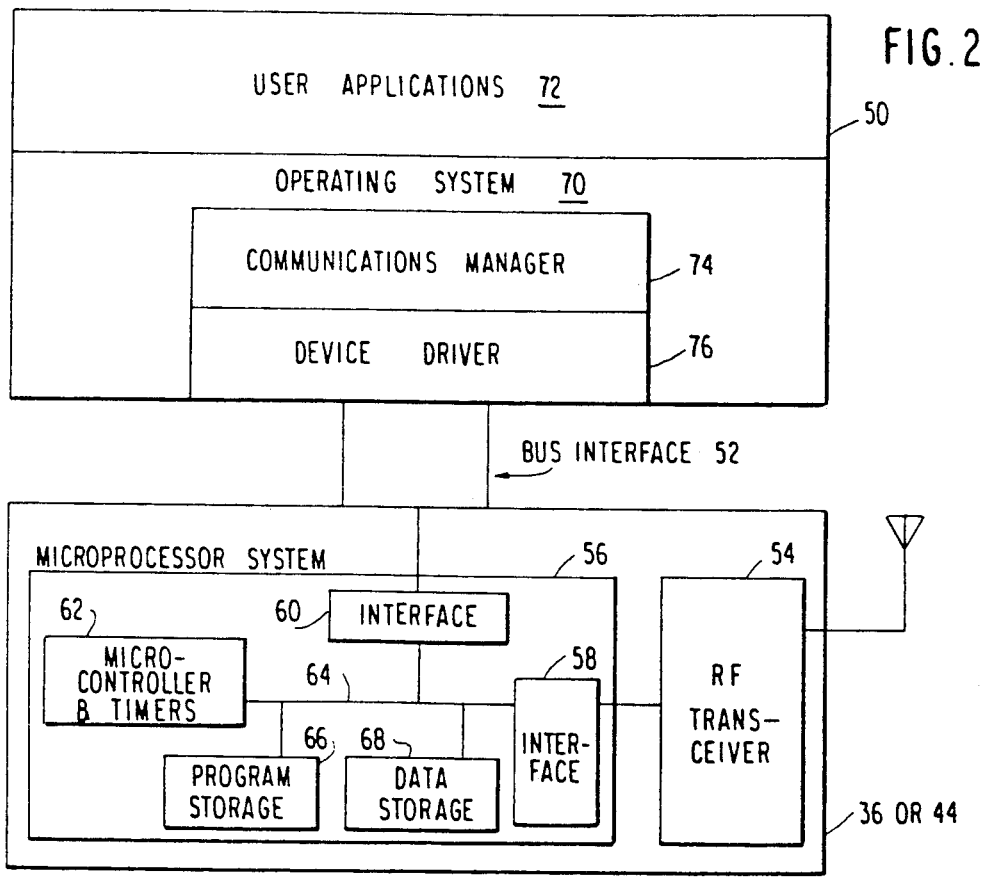
FIG. 2 is a block diagram of the radio system used in the implementation of a preferred embodiment of the invention.

Referring now to the drawings, and more particularly to FIG. 1, there is shown an indoor radio system allowing communication between a plurality of mobile stations 10, 12, 14, and 16 and applications and data residing in a computing system. The computing system typically includes a server 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the mobile stations 10, 12, 14, and 16 communicate. These gateways, referred to as base stations, are augmented according to the invention to provide certain radio system management functions which coördinate the mobile stations' access to the common radio channel. Communications between mobile stations is supported via relay through the base stations 26 and 28.

As shown in more detail in FIG. 1A, a base station 26 or 28, which may be a conventional microcomputer, has a LAN adapter 30 inserted in a bus slot and connected to LAN cabling 32. The server 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

FIG. 2 shows the radio system common to both the mobile stations and the base stations of FIG. 1. The radio system includes a transceiver adapter 36 or 44 connected to the computer 50 via the computer's bus interface 52. The transceiver section is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example, Mischa Schwartz, *Telecommunication Networks: Protocols, Modeling and Analysis*, Addison-Wesley (1988).

When a packet is received through the RF transceiver 54, the serial channels check the packet destination address, check for errors, and deserialize the packet to data storage 68. The serial channels must have the capability to recognize a specific adaptor address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
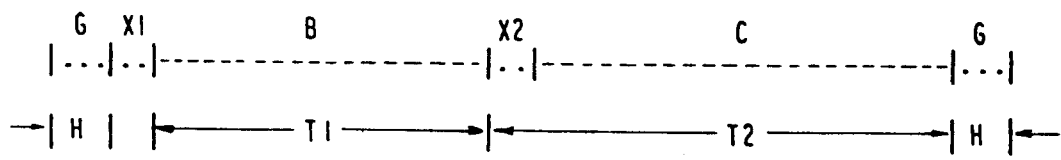
FIG. 3 is a data framing diagram showing the protocol implemented by the preferred embodiment of the invention.

FIG. 3 shows the protocol implemented by the invention. While the protocol is equally applicable to radio frequency (RF), infrared (IR), or wired transmission systems with broadcast capability, and to either conventional or spread-spectrum modulation techniques, slow-frequency-hopped spread spectrum radio systems have a natural affinity for the protocol since those systems share a structure to time with the protocol. However, the invention has been implemented using direct sequence spread spectrum systems which may be readily adapted to the protocol.

With reference to FIG. 3, there are five intervals defining a "hop". The first (and last) interval, G, is the interval during which the transmitter carrier frequency is changing. Note that the G interval is needed only for frequency hopping systems. This interval has a duration H. The next interval, $X_1$, is the interval during which the base station broadcasts a special message to all the mobile stations identifying the beginning of the following, or B, interval. The B interval is the interval during which, by convention, only the base station may initiate transmission and mobile stations may respond only when required by the message protocol. For example, the mobile station may acknowledge a message outbound from the base or may respond when polled. The B interval has a duration $T_1$. The B interval is followed, in turn, by the $X_2$ interval which is the interval during which the base station broadcasts a special message to all the mobile stations identifying the end of the B interval and, by implication, the beginning of the C interval. The message also conveys the length of the C interval and, optionally, the length of the B interval as well.

The $X_2$ broadcast message is not strictly necessary. Information about the entire hop structure can be conveyed in the $X_1$ interval. The $X_2$ message is included to support operation of simplified remote stations capable of only contention-mode operation. These stations wait for the $X_2$ message and contend subsequently.

The C interval is the interval during which any station, including (or optionally excluding) the base station, may contend for the channel and transmit a message without the consent of the base station. For example, a CSMA/CA (carrier sense multiple access with collision avoidance) protocol may be used in this interval. The C interval is approximately of duration $T_2$.

If a mobile station sends a message and receives an acknowledgement, it can assume the message has been received correctly. If not, it will contend again. There is a guard interval at the end of the C interval during which a mobile station with a particular message may not transmit. If $T_{msg}$ is the time to transmit a particular message and $T_{ack}$ is the time to transmit an acknowledgement and $T_{turnaround}$ is the time between the end of a transmission of a message and the initiation of the transmission of an acknowledgement, then the guard interval is $T_{msg}+T_{ack}+T_{turnaround}$. Note that because $T_{msg}$ is a function of the length of the message to be transmitted, the guard interval may be different for different mobile stations having a message to send. The guard interval is not wasted; rather, messages and acknowledgements are sent and received right up to the end of the C interval.

By varying the time $T_2$, the base station can expand or contract the contention interval. If the system is very lightly loaded and most of the traffic is inbound to the base station, it is advantageous to mobile response time to lengthen the time period $T_2$. Conversely, if the system is heavily loaded and most of the traffic is outbound, the time period $T_2$ should be minimized. The time period $T_2$ should not be reduced to zero, however, as it is the only mechanism by which a newly activated mobile station can register itself to the base station.

Figure 3A:
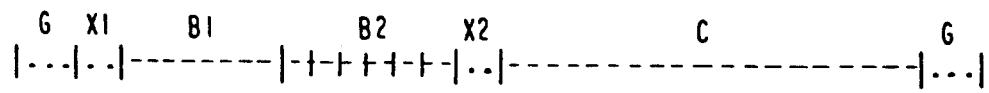
FIG. 3A is a data framing diagram showing a modification of the basic protocol illustrated in FIG. 3.

Additionally, a further subdivision of the B interval, in which remote-to-base traffic is carried in allocated time slots, may be made as shown in FIG. 3A. In FIG. 3A, the B interval is subdivided into $B_1$ and $B_2$ subintervals, and the $B_2$ subinterval is, in turn, subdivided into a plurality of time slots, each time slot being allocated to a specific remote station. Requests for an allocated slot may be made by a remote station in response to a poll during the $B_1$ subinterval, or the requests may be made during the C interval. Once confirmed by a message from the base station, slot allocation guarantees that the remote station can transmit to the base station during its allocated time slot.

By varying the boundary between the $B_2$ subinterval and the C interval, the suitability of the system to different types of traffic can be adjusted. As the traffic load for steady, predictable traffic (e.g., real-time audio and video) increases, the boundary can be moved to lengthen the $B_2$ subinterval and shorten the C interval, thereby increasing the number of allocatable time slots. Conversely, as the traffic becomes less predictable, the boundary can be moved to lengthen the C interval, providing greater bandwidth for contention-based traffic.

From FIG. 3, it will be appreciated that the "hop" is divided into to two subdivisions, one of which supports a controlled access scheme and the other of which supports a random access scheme. The invention may operate in any one of three modes: one in which only the $X_1$ message is sent, one in which only the $X_2$ message is sent, and one in which both are sent.

In the case where only the $X_1$ message is sent, the $X_1$ message constitutes the header section of a frame. It identifies the start of the information frame, carries a unique identification of the base station, identifies the frequency hopping pattern, and defines the length of the B and C intervals. Optionally the $X_1$ message also carries general broadcasting and system control information.

In operation, each mobile station waits for the $X_1$ message. When received, a mobile station sets an internal timer for $T_1$ and for $T_1 + T_2$ so that it knows when the contention interval begins and when to schedule its next frequency change. Broadcast reception of messages is not guaranteed, only likely. Radio conditions may be such that a particular mobile station does not hear the broadcast message $X_1$. Because a mobile station cannot transmit autonomously without first hearing the $X_1$ message and letting $T_1$ elapse, it will remain quiet for the entire frame. Alternatively, if the mobile station is polled by the base station during interval B, it may respond, but in no case can it contend in the C interval. It must remember $T_1 + T_2$ from the last frame so that it knows when to hop, and it will listen in the next frame for the $X_1$ message. If no $X_1$ message is heard for a number of consecutive frames, the mobile station must assume that it has lost hop synchronization with the rest of the system and enter a synchronization acquisition mode.

Each frame time period of length $T = T_1 + T_2$ can also be a frequency hopping period for implementation under FCC regulation part 15. A fixed length of time T is recommended but not necessary. A fixed length of time T is especially useful in the following cases:

1) When several frequency hopping patterns are used in overlapped operation in a multicell radio system, a fixed length of time T makes interference separation much more feasible. In this case, the frequency hopping pattern information in the header section can be used to identify the hopping sequence for a mobile terminal to follow.

2) If all radios in a system are hopping with the same pattern, a fixed length of time T permits different cells to hop in synchronism but at different phases of the hopping pattern. This eliminates interference between cells.

A tradeoff needs to be made in selecting the length of time T. A large time T makes the system overhead smaller, and a small time T makes the system response time smaller.

Instead of the $X_1$ message, the system can transmit the $X_2$ message only. The content of the $X_2$ message can be similar to that of the $X_1$ message except that mobile stations receiving the $X_2$ message can immediately begin contention. This may be an advantage in some applications.

For the case of transmitting the $X_2$ message only, suppose the base station polls a mobile station near the end of the B interval, and the mobile station responds with a lengthy message. (Generally, the protocol must prohibit these responses from being too lengthy.) It may be that the response is active even as the period $T_1$ expires. With only $X_1$ messages, this may be a problem, but with $X_2$ messages, the base station can then originate the $X_2$ message as soon as the response is complete, making sure to include a shortened $T_2$ period in the $X_2$ message. The effect will be to diminish the contention interval for one hop's duration.

In the third mode of operation, both $X_1$ and $X_2$ messages can be used to simplify the implementation of the mobile station and to provide redundancy. The $X_1$ message would then signal the beginning of the B interval, and the $X_2$ massage, the C interval.

In a specific implementation of the invention, the $X_1$ message only was used. An advantage of the $X_1$ message over the $X_2$ message is that the time of occurrence of the $X_1$ message is known to the mobile stations which, in order to save power, may power down their receivers until the time the $X_1$ message is expected. This also reduces susceptibility to spurious reception of X-type messages. The combination of $X_1$ and $X_2$ messages is the safest and simplest to implement at the mobile stations. $X_2$ messages only can provide some simplicity for contention-only mobiles.

The dynamic adjustment of the relative durations of the B and C intervals depending on the load of the system is an important aspect of the subject invention. Since all messages involve the base station, the base station can recorded the relative traffic intensity (number of messages) in each of the B and C intervals. The recording is typically done by keeping running tallies of the number of messages in each interval over a predetermined time period. At the end of the time period, the base station evaluates the tallies accumulated for each interval and, based on this information and other related factors, makes a decision as to whether the length of each interval is to be varied.

As a specific example, consider the modified protocol shown in FIG. 3A. If the number of messages from the base station to the mobile stations is large, the base station may choose to lengthen the $B_1$ subinterval and correspondingly shorten the $B_2$ subinterval and C interval. Conversely, if the C interval is heavily utilized and the mobile stations have little demand for allocated slots, the C interval can be lengthened at the expense of the $B_2$ subinterval.

Since the length of the $B_1$ interval need only be sufficient to exhaust the base station's transmit queue for a particular frame, the base station may dynamically vary the length of this subinterval for each frame. The base station must estimate the length of the $B_1$ subinterval at the time the $X_1$ message is broadcast. This estimate is based on the number and length of the messages in the transmit queue at the start of the frame.

Other measures of traffic may also be taken into consideration by the base station. For example, a decision to lengthen the $B_2$ subinterval would most effectively be made on the basis of the number of outstanding slot allocation requests made by mobile stations. In addition, mobile stations may monitor the delay experienced in attempting to use the C interval (or the collisions they experience) and report this information to the base station either in response to periodic requests from the base station for status or as a field in the packet itself. Alternatively, the base station can determine the average transmit queue lengths for itself and all the active remotes. The queue lengths for the remote stations can be determined by periodic reporting or by including queue lengths in all packets transmitted to the base station.

FIGS. 4A and 4B, taken together, are a flow diagram showing the logic of the adjustment of the proportions of the lengths of the $B_1$ and $B_2$ subintervals and the C interval. Source code in an appropriate computer language, such as C, Pascal or BASIC, supported by the base station computer can be written from the flow diagram by a computer programmer skilled in the particular computer language used.

Referring now to FIG. 4A, the process begins by a routine process of system initialization during which tally counters for the $B_1$ and $B_2$ subintervals and the C interval are set to zero and a period counter is preset to a predetermined time period. Then, in function block 80, the tally counters are advanced for messages during each of the $B_1$ and $B_2$ subintervals and the C interval. Periodically, the period timer is checked in decision block 82, and when the period timer has expired, the number of messages in the base station transmit queue is checked in function block 86. In addition, the base station checks in function block 88 the reported delays from the mobile stations. The information thus accumulated, i.e., the number actual of messages for each interval, the relative numbers of messages between intervals, the length of the transmit queue, and the delays reported by the mobile stations, is used to determine whether an adjustment in the intervals is required. The adjustment criteria may be determined empirically for a specific application. A test is made in decision block 90 to determine if any adjustment criteria are met, and if not, then the tally counters and the period timer are reset in function block 92 before the process loops back to function block 80.

If any adjustment criteria are met, then the process goes to FIG. 4B, as indicated by the C connector. In FIG. 4B, a series of tests are made. The first is made in decision block 94 to determine if subinterval $B_1$ is to be changed. If so, the adjustment is made in function block 96. Next, a test is made in decision block 98 to determine if subinterval $B_2$ is to be changed. If so, the adjustment is made in function block 100. Finally, a test is made in decision block 102 to determine if interval C is to be changed. If so, the adjustment is made in function block 104. At this point, a return is made to FIG. 4A, as indicated by the D connector, and function block 92.

The foregoing description assumes that the mobile stations are synchronized with the base station. The process by which a mobile station initially establishes contact with a base station will now be described. The description is given for slow-frequency hopped systems, which are generally the more difficult to synchronize.

Mobile stations have an apriori knowledge of the set of carrier frequencies that are available in a given system. For example, in the 915 Mhz ISM band (902-928 MHz), slow-frequency hopped (SLH) systems have a maximum channel width of 0.5 MHz, yielding 52 channels spaced 0.5 MHz apart. After various initialization procedures have been accomplished, a mobile station that wishes to contact a base station tunes its receiver to one of the available channels and waits for the receipt of the $X_1$ or $X_2$ messages. With hop lengths of $T_1+T_2+H=50$ milliseconds, for example, the average length of time a mobile station must wait is $52\times50\times0.5=1300$ milliseconds, or 1.3 seconds. Upon receiving the $X_1$ or $X_2$ message, the mobile station then learns the hop duration, base station identifier, and hopping pattern from the content of the message. The mobile station then changes receiver frequency appropriately at the end of the hop and awaits the $X_1$ or $X_2$ message on the next hop. After some number of hops, where all or almost all of the $X_1$ or $X_2$ messages have been received successfully, the mobile station declares itself synchronized to the base station. If a sufficient number of $X_1$ or $X_2$ messages are not received on successive hops, the mobile station then returns to a single frequency listening mode in order to reacquire the base station or an alternate base station.

Referring now to FIGS. 5A and 5B, the logic of the base station program implementing the protocol is illustrated in flow diagram form. The flow diagram is for the modified protocol as shown in FIG. 3A, and those skilled in the art will recognize that the simpler and alternative forms of the protocol may be readily implemented based on the logic of the modified protocol. Source code in an appropriate computer language, such as C, Pascal or BASIC, supported by the base station computer can be written from the flow diagram by a computer programmer skilled in the particular computer language used.

The process begins in FIG. 5A by a routine process of system initialization, after which phase $B_1$ is entered. At the beginning of phase $B_1$, the phase identification is set to phase $B_1$, the timer set for the phase $B_1$ duration, and message $X_1$ is broadcast, as indicated in function block 106. Messages to the various mobile stations are transmitted from the transmit queue and acknowledgements are received from the polled mobile stations in function block 108. Periodically, the phase timer is checked in decision block 110 to determine if time has expired. If not, the process loops back to function block 108 to continue transmitting messages from the transmit queue.

When the phase timer has expired, phase $B_2$ begins by setting the phase identification to $B_2$ and setting the timer for the $B_2$ duration in function block 112. Received messages are placed in a receive queue, and acknowledgements are transmitted to the mobile stations from which the messages are received, as indicated in function block 114. Periodically, the phase timer is checked in decision block 116 to determine if the timer has expired. If not, the process loops back to function block 114 to continue receiving messages.

When the phase timer has expired, the process goes to FIG. 5B, as indicated by the connector A. Phase C begins at the top of FIG. 5B by setting the phase identification to C and setting the timer to the duration of the C interval in function block 118. The base station then transmits the $X_2$ broadcast message at function block 120 notifying the mobile stations of the beginning of the C interval.

During the C interval, messages received from the mobile stations are put in the receive queue, and acknowledgements are transmitted to those mobile stations from which messages have been received, as indicated by function block 122. Mobile stations transmitting messages and not receiving an acknowledgement assume that their message has not been received. In that case, the message is retained in the mobile stations transmit queue for retransmission during the next frame. Periodically, the phase timer is checked in decision block 124 to determine if the timer has expired. If not, the process loops back to function block 122 to continue receiving messages from the mobile stations.

When the timer has expired, hop processing is performed during the G interval in function block 126. This processing is in accordance with the schedule broadcast in the $X_1$ message. The process then goes to phase $B_1$ in function block 128, and the same protocol is repeated during the next frame.

The software for the mobile stations is similar as shown by the flow diagram in FIGS. 6A and 6B. System initialization is first performed, and then the system waits for the $X_1$ message in function block 130. When the $X_1$ message is received, the phase identification is set for $B_1$ and the timer duration is set for the $B_1$ interval in function block 132. During this interval, messages received from the base station are stored in a receive queue, and acknowledgements are sent to the base station in function block 134. Periodically, the phase timer is checked in decision block 136 to determine if the timer has expired. If not, the process loops back to function block 134 to continue to receive messages that may be transmitted by the base station.

When the timer has expired, phase $B_2$ is entered by setting the phase identification to $B_2$ and setting the timer to the $B_2$ interval duration in function block 138. Then, in function block 140, the slot timer is set to the beginning of the allocated time slot for the mobile station. The system waits for the slot timer in decision block 142 and, continuing to FIG. 6B as indicated by the B connector, when the slot timer times out, the mobile station transmits a message from its message queue and receives an acknowledgement from the base station in function block 144. The system next waits for the phase timer in decision block 146

Phase C commences when the $X_2$ broadcast message is received, as determined in decision block 148. The $X_2$ broadcast message is expected after the phase timer times out in decision block 146. In the mobile station, phase C is initiated by setting the phase identification to C, setting the phase timer to the phase duration, and setting the slot timer to a random multiple of the slot width in function block 150. Phase C implements a slotted ALOHA protocol as described, for example, by Mischa Schwartz, supra. The system then waits for the slot timer in decision block 152. The mobile station transmits from the transmit queue and receives an acknowledgement in function block 154 in response to the slot timer. As mentioned, if the mobile station does not receive an acknowledgement, it assumes that the message was not received. In that case, the message is retained in the transmit queue for transmission during the next frame. Thereafter, the system waits for the phase timer in decision block 156. When the phase timer times out, hop processing is performed in function block 158 according to the data received in the $X_1$ message, and the process goes to phase $B_1$ for the next frame in function block 160.

While the invention has been described in terms of a preferred embodiment with various alternatives, those skills in the art will recognize that the invention can be practiced with modification within the spirit and scope of the appended claims. For example, the protocol according to the invention may be implemented in a distributed file system composed of only remote stations, one of which is designated as a base station. Moreover, the designation of the base station can be made to be dynamic in the event that a currently designated base station should fail. Accordingly, those skilled in the art will recognize that there are other environments in which the protocol according to the invention could be implemented.

Having thus described our invention, what we claim as new and desire to secure by Letters Patent is as follows:

1. An indoor digital data radio communication system comprising:

a plurality of remote stations each including a spread spectrum radio frequency transceiver; and a computer system including a base station having a spread spectrum radio frequency transceiver, said base station transceiver including means for defining a plurality of frames during which messages and data are transmitted over a radio channel, each of said frames being demarcated into two intervals, one for controlled access by the base station and one for contention access by the remote stations, and means for varying said two intervals depending on message traffic load of the system.

2. The indoor digital data radio communication system recited in claim 1 wherein said spread spectrum transceivers are frequency hopped spread spectrum transceivers, said frames being defined by frequency hops.

3. The indoor digital data radio communication system recited in claim 1 wherein said spread spectrum transceivers are direct sequence digital spread spectrum transceivers.

4. The indoor digital data radio communication system recited in claim 1 wherein said one interval for controlled access is further divided into two subintervals, said base station including means for polling said remote stations during a first of said two subintervals, and said remote stations being allocated a time slot during a second of said two subintervals by said base station for transmitting to said base station.

5. The indoor digital data radio communication system recited in claim 1 wherein said means for varying said two intervals includes means for measuring a number of messages during each interval over a predetermined period of time; and means for comparing a relative number of messages for each said interval.

6. The indoor digital data radio communication system recited in claim 5 wherein said one interval for controlled access is further divided into two subintervals, said base station including means for polling said remote stations during a first of said two subintervals, and said remote stations being allocated a time slot during a second of said two subintervals by said base station for transmitting to said base station.

7. The indoor digital data radio communication system recited in claim 5 wherein said base station further includes a transmit queue for temporarily storing messages to be transmitted to said remote stations and wherein said means for varying further comprises means for checking a number of messages in said transmit queue as a criteria for varying said intervals.

8. The indoor digital data radio communication system recited in claim 7 wherein said remote stations include means for accumulating data on delays encountered by said remote stations in successfully transmitting messages to said base station during the interval for contention access, said remote stations transmitting said data to said base station during the interval for controlled access, and wherein said means for varying further comprises means for checking said data on delays encountered by said remote stations as a criteria for varying said intervals.

9. The indoor digital data radio communication system recited in claim 5 wherein said remote stations include means for accumulating data on delays encountered by said remote stations in successfully transmitting messages to said base station during the interval for contention access, said remote stations transmitting said data to said base station during the interval for controlled access, and wherein said means for varying further comprises means for checking said data on delays encountered by said remote stations as a criteria for varying said intervals.

10. A method for indoor digital data radio communication between a plurality of remote stations each including a spread spectrum radio frequency transceiver and a computer system including a base station having a spread spectrum radio frequency transceiver, said method performed by said base station and comprising the steps of:

defining a plurality of frames during which messages and data are transmitted over a radio channel, each of said frames being demarcated into two intervals, one for controlled access by the base station and one for contention access by the remote stations, and varying said two intervals depending on message traffic load of the system.

11. The method for indoor digital data radio communication recited in claim 10 further comprising the step of broadcasting by said base station prior to said controlled access interval a message to said remote stations identifying a beginning and a duration of said controlled access interval.

12. The method for indoor digital data radio communication recited in claim 10 further comprising the step of broadcasting by said base station prior to said contention access interval a message to said remote stations identifying an end of said controlled access interval and a duration of said contention access interval.

13. The method for indoor digital data radio communication recited in claim 10 further comprising the steps of:

broadcasting by said base station prior to said controlled access interval a message to said remote stations identifying a beginning of said controlled access interval; and broadcasting by said base station prior to said contention access interval a message to said remote stations identifying an end of said controlled access interval and a duration of said contention access interval.

14. The method for indoor digital, data radio communication recited in claim 10 further comprising the steps of:

measuring by said base station a number of messages during each interval over a predetermined period of time;

comparing by said base station a relative number of messages for each said interval; and determining by said base station whether said intervals should be varied depending on relative message traffic intensity of each said interval.

* * * * *